(12) United States Patent
Paparatto et al.

(10) Patent No.: US 7,048,905 B2
(45) Date of Patent: May 23, 2006

(54) PROCESS FOR THE PRODUCTION OF HYDROGEN PEROXIDE

(75) Inventors: Giuseppe Paparatto, Cinisello Balsamo-Milan (IT); Franco Rivetti, Milan (IT); Pietro Andrigo, Novara (IT); Giordano De Alberti, Besnate-Varese (IT); Ugo Romano, Vimercate (IT)

(73) Assignees: Polimeri Europa S.p.A., Brindisi (IT); ENI S.p.A., Rome (IT)

( * ) Notice: Subject to any disclaimer, the term of this patent is extended or adjusted under 35 U.S.C. 154(b) by 125 days.

(21) Appl. No.: 10/343,323

(22) PCT Filed: Aug. 3, 2001

(86) PCT No.: PCT/EP01/09039

§ 371 (c)(1),
(2), (4) Date: Jul. 10, 2003

(87) PCT Pub. No.: WO02/14217

PCT Pub. Date: Feb. 21, 2002

(65) Prior Publication Data

US 2004/0037769 A1    Feb. 26, 2004

(30) Foreign Application Priority Data

Aug. 11, 2000 (IT) .......................... MI2000A1881

(51) Int. Cl.
*C01B 15/029* (2006.01)
(52) U.S. Cl. .................................................. 423/584
(58) Field of Classification Search .................. 203/18, 203/19; 423/584
See application file for complete search history.

(56) References Cited

U.S. PATENT DOCUMENTS

| 4,335,092 | A |   | 6/1982  | Dalton, Jr. et al.          |
|-----------|---|---|---------|------------------------------|
| 4,564,514 | A | * | 1/1986  | Drauz et al. ........... 423/589 |
| 5,194,242 | A |   | 3/1993  | Paoli                        |
| 5,641,467 | A |   | 6/1997  | Huckins                      |
| 5,670,028 | A | * | 9/1997  | Inaba et al. ............ 203/86 |
| 6,375,920 | B1 | * | 4/2002  | Fischer et al. ........... 423/584 |
| 6,649,140 | B1 | * | 11/2003 | Paparatto et al. ...... 423/584 |
| 6,780,288 | B1 | * | 8/2004  | Bloomfield et al. ....... 203/12 |

FOREIGN PATENT DOCUMENTS

| EP | 0 787 681 | 8/1997 |
| EP | 0 978 316 | 2/2000 |

* cited by examiner

*Primary Examiner*—Wayne A. Langel
(74) *Attorney, Agent, or Firm*—Oblon, Spivak, McClelland, Maier & Neustadt, P.C.

(57) ABSTRACT

Process for the production of concentrated aqueous solutions of hydrogen peroxide, comprising the following steps: (a) feeding to a reactor containing a catalyst based on palladium and platinum, heterogeneous and maintained in dispersion in a liquid reaction medium: (i) a liquid stream consisting of an alcohol or a mixture of C1–C3 alcohols or a mixture of said alcohols with water containing at least 50% by weight of alcohol, also containing an acid promoter and a halogenated promoter, the alcohol and optionally all or part of the water contained in the stream being recycled from the subsequent phase d); (ii) a gaseous stream containing hydrogen, oxygen and an inert gas, characterized in that the concentration of the hydrogen is less than 4.5% by volume and the concentration of the oxygen is less than 21% by volume, the complement to 100 being an inert gas; (b) removing from the reactor: (iii) a liquid stream consisting of stream (i) and also containing the hydrogen peroxide and water produced by the reaction, characterized in that the concentration of hydrogen peroxide ranges from 2% to 10% by weight; and (iv) a gaseous stream essentially consisting of non-reacted hydrogen and oxygen and the inert gas, (c) optionally adding to (iii) water in such a quantity so that its content is at least equal to that of the final aqueous solution of hydrogen peroxide; (d) sending the stream deriving from (c) to a system consisting of one or more evaporators or distillation columns from which the following are removed: (v) one or more streams containing all the alcohol and possibly water, which are recycled to (a); (vi) a concentrated aqueous solution of H2O2 at a concentration ranging from 15 to 60% by weight; (vii) optionally a stream containing the water fed in excess in (c).

29 Claims, No Drawings

PROCESS FOR THE PRODUCTION OF HYDROGEN PEROXIDE

The present invention relates to a process for the production of concentrated aqueous solutions of hydrogen peroxide ($H_2O_2$), suitable for industrial and commercial use.

The production of aqueous solutions of $H_2O_2$ by means of a complex two-step process, is applied on an industrial scale. In this process a solution of an anthraquinone, such as ethyl-anthraquinone or tert-butyl-anthraquinone, in an organic medium immiscible with water is first hydrogenated and then oxidized with air to produce $H_2O_2$, which is subsequently extracted in aqueous phase.

This process is expensive owing to the high investment costs necessary for the complex production unit involved and the necessity of separating and disposing of the by-products generated during the oxidation phase and purifying and reintegrating the anthraquinone solution before being re-used.

For these reasons, processes for the direct synthesis of concentrated aqueous solutions of $H_2O_2$ from $H_2$ and $O_2$, suitable for industrial and commercial use, seem attractive from a technical and economic point of view.

Processes of this kind, although known for a long time in patent literature, are still difficult to effect on an industrial scale and are of little commercial interest for the following reasons:

A) the use of mixtures of $H_2$ and $O_2$ in concentrations within the explosivity range, as the mixture becomes explosive when the concentration of $H_2$ exceeds 4–5% by volume;
B) even when operating outside the explosivity range of $H_2$—$O_2$ mixtures, the use of high concentrations of $O_2$ is risky to handle;
C) the use in the reaction medium of high concentrations of promoters, for example acid, halogenated promoters and/or other additives, with negative consequences relating to the stability of the catalytic system and stability and commercialization of the $H_2$—$O_2$ solution produced;
D) the low productivity and selectivity of the reaction or the production of $H_2O_2$ solutions which are too dilute for economic industrial and commercial exploitation;
E) the poor stability of the catalytic system under the reaction conditions.

For example, U.S. Pat. Nos. 3,361,533, 4,009,252 and 4,661,337 describe processes for the preparation of $H_2O_2$ which use gaseous mixtures of $H_2$ and $O_2$ which are typically included in the explosivity range.

To avoid the safety problems deriving from the use of explosive mixtures of $H_2O_2$, described in A), some processes use ingenious and complex reactor solutions.

U.S. Pat. No. 5,194,242, for example, describes a continuous process for the preparation of $H_2O_2$ in aqueous solution from $H_2$ and $O_2$, which, by means of a specific design of the reaction zone, comprises the use of $H_2$ and $O_2$ in ratios within the explosivity range in the feeding to the reactor, but outside this range in the gaseous stream leaving the reactor.

U.S. Pat. No. 5,641,467 describes a continuous process for the preparation of $H_2O_2$ from $H_2$ and $O_2$ which operates within the inflammability range of $H_2/O_2$ mixtures under safety conditions, using a reaction apparatus suitable for producing a series of gas bubbles sufficiently small and sufficiently dispersed and separate from each other in the liquid reaction medium as to avoid any possible explosion in the reactor.

These processes however are complex from an industrial point of view and their intrinsic safety is doubtful.

For the same purpose, i.e. to avoid safety problems deriving from the use of explosive $H_2$—$O_2$ mixtures described in A), numerous other processes describe, on the other hand, the use of mixtures of $H_2$ and $O_2$ poor in hydrogen (concentration less than 4–5% by volume with respect to $O_2$), to ensure that they are outside the explosivity range, These processes, however, use extremely high concentrations of $O_2$, whose use has a considerable degree of risk.

U.S. Pat. No. 5,500,202 describes a continuous process for the preparation of aqueous solutions of $H_2O_2$ from $H_2$ and $O_2$ which operates in a trickle bed reactor using, in the feeding, a gaseous mixture of $H_2/O_2/N_2$ containing 4.6–6.2% by volume of $H_2$ and 57–62% by volume of $O_2$, so that the mixture leaving the reactor is outside the explosivity limits.

U.S. Pat. No. 4,279,883 describes a continuous process for the preparation of aqueous solutions of $H_2O_2$ from $H_2$ and $O_2$ characterized by a particular pre-treatment of the solution and catalyst with $H_2$ and in which the mixture of gases at the outlet of the reactor is kept with the volume composition of 3% $H_2$ and 30% $O_2$, the remaining percentage being $N_2$.

International patent application WO 93/14025 describes a process for the preparation of aqueous solutions of $H_2O_2$ from $H_2$ and $O_2$ characterized by the use of particular catalysts and stabilizers of the catalytic activity and carried out in the presence of gaseous mixtures kept outside the explosivity limits of $H_2$, with $O_2$ being fed in pure form or preferably mixed with $N_2$ to obtain a preferred $H_2/O_2/N_2$ composition equal to 3.2%/86.8%/10.0% respectively by volume.

International patent application WO 92/15520 describes a process for the preparation of aqueous solutions of $H_2O_2$ from $H_2$ and $O_2$ characterized by the use of particular catalysts and stabilizers of the catalytic activity and carried out in the presence of gaseous mixtures kept outside the explosivity limits of $H_2$, with $O_2$ being fed in pure form without inert gases.

European patent application EP 0,627,381 describes a process for the preparation of aqueous solutions of $H_2O_2$ from $H_2$ and $O_2$ characterized by the use of particular catalysts and carried out in the presence of gaseous mixtures kept outside the explosivity limits of $H_2$ in the presence of inert gases such as nitrogen so as to obtain a preferred $H_2/O_2/N_2$ composition equal to 3%/47%/50% respectively, by volume.

In other cases, the use of mixtures of $H_2$ and $O_2$ outside the explosivity range and using low concentrations of $O_2$ prove to have a low reaction productivity and selectivity or to produce $H_2O_2$ solutions which are too dilute for an economic industrial exploitation.

For example U.S. Pat. No. 5,082,647 describes a process for the preparation of aqueous solutions of $H_2O_2$ from $H_2$ and $O_2$ characterized by the use of particular catalysts and carried out in a trickle bed reactor, feeding a gaseous mixture containing 3% of $H_2$ by volume in air. In the example described, after 5 hours the solution re-circulated through the reactor contained 0.3% of $H_2O_2$.

In other cases, in an attempt to guarantee a sufficient reactivity of the catalytic system, although operating under safety conditions as regards the composition of the $H_2O_2$ mixtures, enormous quantities of promoters are used, which however destabilize the catalytic system and the $H_2O_2$ solution produced.

For the above reasons, none of the processes described in the state of the art can as yet be exploited on an industrial scale.

The Applicant has now found a process which can be used on an industrial scale, under safety and economic conditions, which allows the preparation of concentrated aqueous solutions of hydrogen peroxide, suitable for industrial and commercial use, by means of direct synthesis starting from $H_2$ and $O_2$.

An object of the present invention therefore relates to a process for the production of concentrated solutions of hydrogen peroxide by means of direct synthesis, starting from $H_2$ and $O_2$, comprising the following steps:

(a) feeding to a reactor containing a catalyst based on palladium and platinum, heterogeneous and maintained in dispersion in a liquid reaction medium:
  (i) a liquid stream consisting of an alcohol or a mixture of $C_1$–$C_3$ alcohols or a mixture of said alcohols with water containing at least 50% by weight of alcohol, also containing an acid promoter and a halogenated promoter, the alcohol and optionally all or part of the water contained in the stream being recycled from the subsequent phase d);
  (ii) a gaseous stream containing hydrogen, oxygen and an inert gas, characterized in that the concentration of the hydrogen is less than 4.5% by volume and the concentration of the oxygen is less than 21% by volume, the complement to 100 being an inert gas;

(b) removing from the reactor:
  (iii) a liquid stream consisting of stream (i) and also containing the hydrogen peroxide and water produced by the reaction, characterized in that the concentration of hydrogen peroxide ranges from 2% to 10% by weight; and
  (iv) a gaseous stream essentially consisting of non-reacted hydrogen and oxygen and the inert gas, (c) optionally adding to (iii) water in such a quantity so that its content is at least equal to that of the final aqueous solution of hydrogen peroxide;

(d) sending the stream deriving from (c) to a system consisting of one or more evaporators or distillation columns from which the following are removed:
  (v) one or more streams containing all the alcohol and possibly water, which are recycled to (a)
  (vi) a concentrated aqueous solution, as defined above, of $H_2O_2$ with a titer ranging from 15 to 60% by weight, preferably from 20 to 50%, more preferably with a titer equal to 35%
  (vii) optionally a stream containing the water fed in excess in (c).

The Applicant is the holder of Italian patent application MI 2000 A001218 filed on 01.06.2000 whose technical description is referred to hereunder (to integrate and support the description of invention according to the present application).

The patent MI 2000 A001218 relates to a process for the continuous production of alcohol or hydro-alcohol solutions of hydrogen peroxide in a concentration ranging from 2 to 10% by weight.

The process for the production of concentrated aqueous solutions of hydrogen peroxide according to the present invention substantially comprises steps (a) and (b) already described by Italian patent MI 2000 A001218, to which an optional feeding or additional feeding of water and a final distillation phase for the removal and recycling of the alcohol or a hydro-alcohol mixture and the recovery of a concentrated aqueous solution of hydrogen peroxide, are added.

The aqueous solution of $H_2O_2$ contains the acid promoter and halogenated promoter contained in the starting alcohol or hydro-alcohol mixture and a residual content of alcohol generally less than or equal to 2% by weight and preferably less than or equal to 1% by weight.

The reactor used can be any reactor suitable for operating in continuous and conducting the reaction in a tri-phasic system such as that described, obtaining an effective contact between the gaseous phase, liquid phase and the catalyst maintained in dispersion (so-called slurry system).

Reactors suitable for the purpose are, for example, stirred reactors, bubble reactors, gas-lift reactors with internal or external circulation, as described in the art.

The reactor is kept under suitable temperature and pressure conditions. According to the process, object of the present invention, the temperature normally ranges from $-10°$ C. to $60°$ C., preferably from $0°$ C. to $40°$ C. The pressure normally ranges from 1 to 300 bars, preferably from 40 to 150 bars.

The residence time of the liquid medium in the reactor normally ranges from 0.05 to 5 hours, preferably from 0.10 to 2 hours.

The catalyst which can be used for the purposes of the present invention is a heterogeneous catalyst containing palladium and platinum as active components.

In these catalysts, the palladium is normally present in a quantity ranging from 0.1 to 3% by weight and the platinum in a quantity ranging from 0.01 to 1% by weight, with an atomic ratio between platinum and palladium ranging from 1/500 to 100/100.

The palladium is preferably present in a quantity ranging from 0.4 to 2% by weight and the platinum in a quantity ranging from 0.02 to 0.5% by weight, with an atomic ratio between platinum and palladium ranging from 1/200 to 20/100.

In addition to palladium and platinum, other metals of group VIII or IB, such as for example, ruthenium, rhodium, iridium and gold, can be present as active components or promoters, in a concentration generally not higher than that of the palladium.

The catalyst can be prepared by dispersing the active components on an inert carrier by means of precipitation and/or impregnation starting from precursors consisting for example of solutions of their salts or soluble complexes, and then reduced to the metal state by means of thermal and/or chemical treatment with reducing substances such as hydrogen, sodium formiate, sodium citrate using preparative techniques well known in the art.

The inert carrier may typically consist of silica, alumina, silica-alumina, zeolites, activated carbon, and other materials well known in the art.

Activated carbon is preferred for the preparation of the catalysts useful for the invention.

Activated carbons which can be used for the purposes of the invention are selected from those of a fossil or natural origin deriving from wood, lignite, peat or coconut and having a surface area greater than 300 $m^2/g$ and which can reach 1400 $m^2/g$, in particular those having a surface area greater than 600 $m^2/g$.

Preferred activated carbons are those with a low ash content.

Sulfonated activated carbons described in Italian patent application MI 98A01843 are also useful for the purpose.

Before supporting or impregnating the metals, the activated carbon can be subjected to treatment such as washing with distilled water or treatment with acids, bases or diluted oxidizing agents, for example acetic acid, hydrochloric acid, sodium carbonate and hydrogen peroxide.

The catalyst is normally dispersed in the reaction medium at a concentration ranging from 0.1 to 10% by weight, preferably from 0.3 to 3% by weight.

The liquid stream (i) consists of an alcohol or mixture of $C_1$–$C_3$ alcohols or a mixture of these alcohols with water with a prevalent alcoholic content. A mixture with a prevalent alcoholic content means a mixture containing more than 50% by weight of alcohol or mixture of alcohols. Among $C_1$–$C_3$ alcohols, methanol is preferred for the purposes of the present invention. Among the mixtures, a mixture of methanol and water containing at least 70% by weight of methanol, is preferred.

The liquid stream also contains an acid promoter and a halogenated promoter.

The acid promoter can be any substance capable of generating $H^+$ hydrogen ions in the liquid reaction medium and is generally selected from inorganic acids such as sulfuric, phosphoric, nitric acids or from organic acids such as sulfonic acids.

Sulfuric acid and phosphoric acid are preferred. The concentration of the acid generally ranges from 20 to 1000 mg per kg of liquid medium and preferably from 50 to 500 mg per kg of liquid medium.

The halogenated promoter can be any substance capable of generating halogen ions in the liquid reaction medium. Substances capable of generating bromide ions are preferred. These substances are generally selected from hydrobromic acid and its salts soluble in the reaction medium, for example alkaline bromides, hydrobromic acid being preferred.

The concentration of halogenated promoter generally ranges from 0.1 to 50 mg per kg of liquid medium and preferably from 1 to 10 mg per kg of liquid medium.

The gaseous stream (ii) at the inlet contains a concentration of hydrogen of less than 4.5% by volume and a concentration of oxygen of less than 21% by volume, the complement to 100 being an inert gas, which is generally selected from nitrogen, helium, argon.

Said gas is preferably nitrogen.

In the gaseous stream (ii) the concentration of hydrogen preferably ranges from 2% to 4% by volume and the concentration of oxygen preferably ranges from 6% to 15% by volume.

The oxygen can be supplied in said stream using as raw material, pure or substantially pure oxygen, enriched air, containing for example from 21 to 90% of oxygen or air, the composition of the stream then being brought to the desired values, defined above, by the addition of a suitable concentration of inert gas.

The liquid stream (iii) at the outlet of the reactor normally has a concentration of hydrogen peroxide usually ranging from 2% to 10% by weight and preferably from 3% to 8% by weight. It also contains the acid promoter and halogenated promoter in quantities equal to those introduced together with the liquid stream fed, and water in a quantity equal to that introduced with the liquid stream fed, to which the water obtained as reaction by-product is added.

The latter normally represents an additional concentration ranging from 0.5% to 2.5% by weight.

The liquid stream (iii) is separated from the catalyst by means of filtration techniques well known in the art, for example by the use of filter plugs situated inside the reactor or in a specific re-circulation cycle of the reaction mixture, outside the reactor. In this latter case the tangential filtration technique can also be conveniently used.

The gaseous stream (iv) at the outlet of the reactor, essentially consisting of non-reacted hydrogen and oxygen and of the inert gas, generally contains a volume concentration of hydrogen equal to or lower than 2%, normally ranging from 0.5 to 1.5%, and a volume concentration of oxygen generally lower than 18%, normally ranging from 6% to 12%.

In an embodiment of the process of the present invention, the gaseous stream (iv) at the outlet of the reactor is recycled to the feeding to the reactor, after flushing from the system, the fraction necessary for eliminating the quantity of inert gas introduced in excess with the feeding, particularly when air is used as oxygen source. In this case, the gaseous stream (ii) fed to the reactor consists of the recycled fraction of the above stream (iv), with the addition of a quantity of hydrogen and oxygen (as such or in the form of air or enriched air) essentially equal to that used up by the reaction and that flushed.

According to another embodiment of the process of the present invention, the gaseous stream (iv) leaving the reactor is fed to one or more subsequent reactors operating analogously to the one previously described, after adding each time a quantity of hydrogen and oxygen (as such or in the form of air or enriched air) essentially equal to that used up by the reaction which takes place in the single reactors.

The optional addition of water in (c) and subsequent feeding in (d) are preferably carried out after depressurization to atmospheric pressure and washing with inert gas, for example nitrogen, to eliminate the reactive reaction gases. When the distillation system comprises several evaporators or columns, the optional addition of water can be effected before any of the evaporators or columns forming the distillation chain. In this case, the addition of water can be carried out separately and contemporaneously in various points.

The distillation system may comprise one or more evaporators and/or distillation columns, of the type well known in the art, for example drop film or thin film evaporators and plate or filled distillation columns.

When the distillation system comprises several evaporators or columns, it normally has a chain of evaporators or columns whose bases are connected in series, for recovery at the head of the single apparatuses of alcohol or hydroalcohol solutions, which can be recycled to (a)–(i), after being mixed or separately, whereas solutions of $H_2O_2$ are obtained from the bottoms at an increasing concentration until an aqueous solution of $H_2O_2$ is removed from the tail of the last column, at the desired concentration.

The optional stream in (vii) is preferably recovered by subjecting one or more of the hydro-alcohol fractions removed from the head(s), to distillation.

The distillation system in (d) preferably operates at atmospheric or almost atmospheric pressure or under reduced pressure, ranging for example from atmospheric pressure to 50 mbars. When the distillation system in (d) consists of several columns, the columns preferably operate at a varying pressure, normally decreasing, within the above range. Operating under these conditions, the temperature at the bottom of the columns normally ranges from 50 to 75° C.

When the distillation system in (d) consists of a chain of several columns, a stream having a high alcohol titer is preferably removed from the head of the first column, and hydro-alcohol mixtures, having a concentration of alcohol varying within a wide range, for example between 90% and 20% by weight of alcohol, from the heads of the subsequent columns.

Mixtures with a decreasing concentration of alcohol, within the above range, are normally removed along the distillation column chain. Similarly, mixtures are removed from the bottom of the first and subsequent columns, with an increasing concentration of hydrogen peroxide and with an increasing water/alcohol ratio in the mixture, until the complete elimination of the alcohol and production of the aqueous solution of hydrogen peroxide at the desired concentration. Operating under these conditions, the temperature at the head of the columns normally ranges from 20 to 50° C.

The optional addition of water in (c) has the objective of allowing the desired end-titer of $H_2O_2$ to be reached and of maintaining the compositions in the column(s) well outside the instability limits of $H_2O_2$ solutions in the presence of organic solvents, in order to avoid risks associated with the combination of high concentrations of $H_2O_2$ and organic solvent, well known in the art. The addition of water also contributes to reducing the temperatures at the bottom of the column(s) to avoid decomposition of the hydrogen peroxide. In fact, the use of distillation as a method for separating the alcohol content from the alcohol or hydro-alcohol mixture has, on the one hand, the problem of satisfying the necessity of maintaining a low temperature at the bottom of the column(s), and therefore the pressure, to avoid possible decomposition of the hydrogen peroxide, and on the other hand, the convenience of maintaining a sufficiently high temperature at the head, and therefore the pressure, to enable industrial water to be used as thermal exchange fluid for the condensation of the streams at the head of the column.

The use of a system with a single column has, in addition to the obvious advantage of simplicity, the necessity of adopting a cooled fluid as thermal exchange fluid to condense the stream at the head of the column, in order to maintain the boiler temperature at values ranging from 50 to 75° C. The use of a system with two or more columns, allows the use of industrial water as thermal exchange fluid and at the same time enables the temperature at the bottoms to be maintained at values ranging from 50 to 75° C.

Operating under the above conditions, it is possible to produce aqueous solutions of hydrogen peroxide at a concentration ranging from 15 to 60% by weight, preferably varying from 20 to 50%, more preferably equal to 35% of hydrogen peroxide, under safety conditions and with a molar selectivity towards the formation of $H_2O_2$, referring to the hydrogen used up, generally higher than 65%.

The following examples are illustrative but do not limit the scope of the invention described.

EXAMPLE 1

Treatment of the Carrier 50 g of activated maritime pine charcoal in powder form (CECA) and 500 ml of distilled water are charged into a 1 liter glass flask. After 2 hours at 80° C., the charcoal is filtered and washed with 500 ml of distilled water.

The carbon, still damp, is then charged into the 1 liter flask and after adding 500 ml of a solution at 2% by weight of HCl, the temperature is brought to 80° C. After about 2 hours, the mixture is cooled and the activated carbon is washed on a filter with distilled $H_2O$ until the chlorides have been eliminated. The washed activated carbon is recovered and dried in an oven at 120° C. for 2 hours.

EXAMPLE 2

Preparation of the Catalyst 1% Pd-0.1% Pt/C 10 g of activated carbon treated as described in example 1, are charged into a 0.5 liter glass flask, containing 100 ml of distilled water and 0.32 g of $Na_2CO_3$. The suspension is maintained at room temperature (20–25° C.), under stirring, for 10 minutes.

10 ml of an aqueous solution containing 1.0 g of a solution of $Na_2PdCl_4$ at 10% by weight of Pd and 0.1 g of a solution of $H_2PtCl_5$ at 10% by weight, are subsequently added dropwise over a period of about 10 minutes.

The suspension is kept at room temperature for 10 minutes and is then heated in a water bath for 10 minutes to 90° C. A solution containing 0.85 g of sodium formiate in 10 ml of water is then added and the stirring is continued at 90° C. for 2 hours.

After cooling to room temperature, the suspension is filtered and the catalyst recovered is washed with distilled water until the chlorides have been eliminated and dried in an oven at 120° C. for 2 hours.

EXAMPLE 3

Synthesis of Hydrogen Peroxide

A micropilot plant is used, consisting of a Hastelloy C autoclave having a volume of 400 ml, equipped with a thermostat-regulation system, a magnetic drag stirring system, a regulation and control system of the pressure during the reaction, a feeding system of the mixture of solvent and promoters in which the reaction takes place, a filter for continuously removing the liquid phase containing the reaction products, a feeding and discharging system of the gaseous reagents and a series of regulation and control instruments.

The reaction trend is followed by continuously analyzing the hydrogen and oxygen in the feeding and at the outlet of the reactor.

The concentration of $H_2O_2$ which is formed is determined in the reactor liquid effluent by titration with potassium permanganate. The selectivity with respect to the converted hydrogen is calculated on the basis of the concentration of $H_2O_2$ in the reaction effluent and on the basis of analysis of the $H_2$ leaving the reactor, once the stationary state has been reached in the reactor, the liquid and gaseous flow-rates being known.

1.2 g of catalyst prepared as described in example 2 and 150 g of methanol:water solution (97/3 by weight) containing 4 ppm of HBr and 200 ppm of $H_2SO_4$ are charged into the reactor.

The autoclave is pressurized, without stirring, at 130 bars with a gaseous mixture consisting of 3.6% of $H_2$, 13% of $O_2$ and 83.4% of $N_2$ by volume. The stirring is then started up to 800 revs/minute, the pressure is maintained with a continuous stream, 810 normal liters (Nl), of the same gaseous mixture, and 300 g/hour of a methanol:water solution having the composition defined above, is fed at the same time. The temperature inside the reactor is kept at 4° C.

The liquid stream consisting of the feeding and reaction product is brought to atmospheric pressure and appropriately flushed with nitrogen in order to eliminate the dissolved reaction gases.

The test was carried out in continuous for 1100 hours of reaction obtaining the following results: The discharge from the reactor ranges from 325 to 330 g/h with an average weight composition of $H_2O_2$ 6.8–7.2%; $H_2O$ 3.8–4.1%, the rest being methanol. The conversion of the hydrogen is maintained at about 70% with a selectivity to $H_2O_2$ ranging from 72 to 75%. Water is then added to the liquid stream leaving the reactor, after degassing, up to such a quantity that the weight ratio $H_2O_2/H_2O$ becomes 1:2.

EXAMPLE 4

Separation of the Methanol and Concentration of $H_2O_2$

The mixture obtained in example 3 is fed to a distillation column, operating at a pressure of 170 mbars, obtaining, at the tail, at 61° C., an aqueous solution of $H_2O_2$ at 35% by weight, whereas at the head, at 25° C., the methanol is recovered with a high titer (99.5%), and is recycled to example 3.

EXAMPLE 5

Separation of the Methanol and Concentration of $H_2O_2$

The mixture obtained in example 3 is sent to a system consisting of two distillation steps.

The first step, operating at 400 mbars, produces a hydro-alcohol solution of $H_2O_2$ at 20% by weight at the tail, at 60° C., and methanol with a high titer (99.5%) at the head, at 42° C.

$H_2O$ is added to the product at the bottom of the first column, in a weight ratio of 1.5:1 with respect to the $H_2O_2$ contained and the resulting mixture is sent to a second distillation step, which operates at 160 mbars, producing at the tail, at 61° C., an aqueous solution of $H_2O_2$ having a titer of 35% by weight, and a hydro-alcohol solution containing 60% by weight of methanol, at the head, at 35° C.

The invention claimed is:

1. A process for the production of concentrated aqueous solutions of hydrogen peroxide by direct synthesis starting from $H_2$ and $O_2$, comprising:
   (a) feeding to a reactor containing a heterogeneous catalyst based on palladium and platinum and supported on activated carbon, wherein the catalyst is present as a dispersion in a liquid reaction medium:
      (i) a liquid stream comprising an alcohol or a mixture of $C_1$–$C_3$ alcohols or a mixture of said alcohols with water, containing at least 50% by weight of alcohol, also containing an acid promoter and a halogenated promoter, the alcohol and optionally all or part of the water contained in the stream, being recycled from the subsequent phase d);
      (ii) a gaseous stream containing hydrogen, oxygen and an inert gas, wherein the concentration of the hydrogen in the gaseous stream is less than 4.5% by volume and the concentration of the oxygen in the gaseous stream is less than 21% by volume, and the balance is an inert gas;
   (b) removing from the reactor:
      (iii) a liquid stream consisting of stream (i) and also containing the hydrogen peroxide and water produced by the reaction, wherein the concentration of hydrogen peroxide is from 2% to 10% by weight; and
      (iv) a gaseous stream consisting essentially of non-reacted hydrogen and oxygen and the inert gas,
   (c) optionally adding to (iii) water in such a quantity so that its content is at least equal to that of the final aqueous solution of hydrogen peroxide;
   (d) sending the stream deriving from (c) to a distillation system from which the following are removed;
      (v) one or more streams containing all the alcohol and optionally water, which are recycled to (a),
      (vi) a concentrated aqueous solution, as defined above, of $H_2O_2$ with a titer ranging from 15 to 60% by weight,
      (vii) optionally a stream containing the water fed in excess in (c).

2. The process according to claim 1, wherein the reaction is carried out at a temperature of from −10° C. to 60° C.

3. The process according to claim 1, wherein the reaction is carried out at a pressure of from 1 to 300 bars.

4. The process according to claim 1, wherein the residence time in the liquid medium in the reactor is from 0.05 to 5 hours.

5. The process according to claim 1, wherein the catalyst contains palladium in a quantity of from 0.1 to 3% by weight and platinum in a quantity of from 0.01 to 1% by weight, with an atomic ratio between platinum and palladium of from 1/500 to 100/100.

6. The process according to claim 1, wherein the liquid stream (i) consists of methanol or a mixture of methanol and water containing at least 70% by weight of methanol.

7. The process according to claim 1, wherein the acid promoter contained in the liquid stream (i) is at least one of sulfuric acid and phosphoric acid.

8. The process according to claim 1, wherein the acid promoter is present in the liquid stream (i) at concentrations of from 20 to 1000 mg per kg of liquid medium.

9. The process according to claim 1, wherein the halogenated promoter is contained in the liquid stream (i) at a concentration of from 0.1 to 50 mg per kg of liquid medium.

10. The process according to claim 1, wherein the gaseous stream (ii) at the inlet contains hydrogen at a concentration of from 2% to 4% by volume, the concentration of oxygen is from 6% to 15% by volume, and the balance is nitrogen.

11. The process according to claim 1, wherein the liquid stream (iii) at the outlet of the reactor has a concentration of hydrogen peroxide of from 3% to 8% by weight.

12. The process according to claim 1, wherein the gaseous stream (iv) at the outlet of the reactor contains a concentration by volume of hydrogen equal to or lower than 2% and a concentration by volume of oxygen of lower than 18%.

13. The process according to claim 12, wherein the gaseous stream (iv) at the outlet of the reactor contains a concentration by volume of hydrogen of from 0.5 to 1.5% and a concentration by volume of oxygen of from 6 to 12%.

14. The process according to claim 1, wherein the distillation system in (d) operates at atmospheric pressure or at a pressure lower than atmospheric pressure.

15. The process according to claim 14, wherein the distillation system in (d) operates at a pressure of from atmospheric pressure to 50 mbars.

16. The process according to claim 1, wherein the distillation system in (d) includes one or more evaporators or columns.

17. The process according to claim 16, wherein the bottoms of the evaporators or columns are connected in series.

18. The process according to claim 16, wherein alcohol or hydro-alcohol solutions are recovered from the head of the evaporators or columns, and can be recycled in (i) separately or after mixing.

19. The process according to claim 17, wherein solutions of $H_2O_2$ are obtained from the bottoms, at an increasing concentration until an aqueous solution of $H_2O_2$ is removed from the tail of the last column at the desired concentration.

20. The process according to claim 16, wherein the evaporators or columns operate at decreasing pressure.

21. The process according to claim 16, wherein the evaporators or columns operate at atmospheric pressure or a value lower than atmospheric pressure, at a temperature at the bottom of from 50 to 75° C. and a temperature at the head of from 20° to 50° C.

22. The process according to claim 1, wherein the concentration of hydrogen peroxide in the aqueous solution (vi) is from 20 to 50% by weight.

23. The process according to claim 22, wherein the concentration of hydrogen peroxide in the aqueous solution (vi) is equal to 35% by weight.

24. The process according to claim 1, wherein the optional addition of water in (c) and subsequent feeding in (d) are effected after depressurization to atmospheric pressure and washing with an inert gas.

25. The process according to claim 1, wherein the optional addition of water can be effected before any of the evaporators or columns forming the distillation chain, either separately or contemporaneously in various points.

26. The process according to claim 1, comprising:

recovering the optional stream in (vii) by subjecting one or more of the hydro-alcohol fractions removed at the head to distillation.

27. The process according to claim 18, wherein a stream having a high alcohol titer is removed from the head of the first column and hydro-alcohol mixtures, having a concentration of from 90% to 20% by weight of alcohol, are removed from the head of the subsequent columns.

28. The process according to claim 16, wherein the optional addition of water can be effected before any of the evaporators or columns forming the distillation chain, either separately or contemporaneously in various points.

29. The process according to claim 1, wherein the liquid stream consists of an alcohol or a mixture of $C_1$–$C_3$ alcohols or a mixture of said alcohols with water.

* * * * *